(12) United States Patent
Moenter et al.

(10) Patent No.: US 11,022,193 B2
(45) Date of Patent: Jun. 1, 2021

(54) INACCURACY TOLERANT ACTUATION ASSEMBLY, ARTICLE USING THE SAME, AND METHOD OF PRODUCING THE ARTICLE

(71) Applicant: Hill-Rom Services, Inc., Batesville, IN (US)

(72) Inventors: Jonathan Moenter, Batesville, IN (US); Chris L. Hildenbrand, Osgood, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 323 days.

(21) Appl. No.: 15/678,300

(22) Filed: Aug. 16, 2017

(65) Prior Publication Data

US 2018/0051762 A1  Feb. 22, 2018

Related U.S. Application Data

(60) Provisional application No. 62/375,655, filed on Aug. 16, 2016.

(51) Int. Cl.
*F16D 65/28* (2006.01)
*B60B 33/00* (2006.01)
(Continued)

(52) U.S. Cl.
CPC ............ *F16D 65/28* (2013.01); *A61G 7/0528* (2016.11); *B60B 33/0078* (2013.01);
(Continued)

(58) Field of Classification Search
CPC ............ B60B 33/0078; B60B 33/0007; B60B 2200/242; B60B 33/001; B60B 33/04;
(Continued)

(56) References Cited

U.S. PATENT DOCUMENTS 1,394,331 A * 10/1921 Monroe ............... A47C 19/04
5/183
3,368,423 A * 2/1968 Fazekas ............... E05C 17/32
74/165
(Continued)

FOREIGN PATENT DOCUMENTS

| CH | 360163 A | 2/1962 |
| CH | 360163 A | 3/1962 |
| WO | 2015085379 A1 | 6/2015 |

OTHER PUBLICATIONS

European Search Report for EP Application No. 17186416.8; dated Dec. 20, 2017; Place of Search—Munich; Date of completion of the search—Dec. 7, 2017.

(Continued)

*Primary Examiner* — Bradley T King
*Assistant Examiner* — Mahbubur Rashid
(74) *Attorney, Agent, or Firm* — Barnes & Thornburg LLP

(57) ABSTRACT

An actuation assembly includes a torque input element, a torque output element, and a transfer linkage assembly comprising a connector assembly which connects the input element to the output element. The connector assembly includes a first connector having a proximate end and a connector portion. The proximate end of the first connector is the end closer to either the input element or the output element, and the connector portion is further from that same element. The connector assembly also includes a second connector having a proximate end closer to the other of the input element and the output element. The connector portion is further from that same element. The connector portions are selectively joinable to either permit or resist relative longitudinal translation of the first and second connectors.

(Continued)

One example application for the actuation assembly is as an actuation assembly for a braking system on a hospital bed.

20 Claims, 16 Drawing Sheets

(51) Int. Cl.

| | | |
|---|---|---|
| *F16B 7/18* | (2006.01) | |
| *A61G 7/05* | (2006.01) | |
| *F16D 121/14* | (2012.01) | |
| *F16D 125/28* | (2012.01) | |

(52) U.S. Cl.
CPC .......... *B60B 33/0092* (2013.01); *F16B 7/182* (2013.01); *B60B 2200/242* (2013.01); *F16D 2121/14* (2013.01); *F16D 2125/28* (2013.01); *F16D 2250/0084* (2013.01)

(58) Field of Classification Search
CPC ..... B62B 5/0433; B62B 2206/00; B62B 3/02; B62B 7/062; F16D 2121/14; F16D 65/28; F16B 7/00; F16B 7/04; F16B 7/0406; F16B 7/0413; F16B 7/042; F16B 7/0426; Y10T 403/5733; Y10T 403/7077; Y10T 403/7079; Y10T 403/7039; Y10T 403/66
USPC .................. 188/1.12; 74/526, 527, 567–569
See application file for complete search history.

(56) References Cited

U.S. PATENT DOCUMENTS

| | | | | |
|---|---|---|---|---|
| 3,797,051 | A * | 3/1974 | Evans | A61G 1/013 5/627 |
| 3,900,269 | A * | 8/1975 | Pavlot | H02G 3/0608 403/292 |
| 3,902,817 | A * | 9/1975 | Meir | F16B 7/0406 403/188 |
| 3,926,531 | A * | 12/1975 | Gostling | E04G 7/301 403/293 |
| 4,094,330 | A * | 6/1978 | Jong | A61H 3/00 135/67 |
| 4,189,249 | A * | 2/1980 | Gaines | B62D 7/20 228/178 |
| 4,251,105 | A * | 2/1981 | Barker | A61H 3/04 135/67 |
| 4,462,625 | A * | 7/1984 | Barnhill | E05C 19/003 292/259 R |
| 4,594,743 | A * | 6/1986 | Owen | A47C 17/70 5/111 |
| 4,768,259 | A | 9/1988 | Roeck et al. | |
| 5,078,534 | A * | 1/1992 | White | F16B 7/042 403/292 |
| 5,112,044 | A * | 5/1992 | Dubats | A61H 3/04 135/85 |
| 5,779,283 | A * | 7/1998 | Kimura | F16L 37/146 285/305 |
| 5,915,712 | A * | 6/1999 | Stephenson | A61G 5/10 16/422 |
| 6,183,167 | B1 * | 2/2001 | Ruiz | E02D 5/285 403/379.3 |
| 6,321,878 | B1 * | 11/2001 | Mobley | A61G 7/00 188/1.12 |
| 6,371,496 | B1 * | 4/2002 | Balolia | B60T 1/14 188/19 |
| 6,783,147 | B1 * | 8/2004 | Green, Sr. | B62B 1/20 280/47.26 |
| 6,865,969 | B2 * | 3/2005 | Stevens | A63B 22/001 482/57 |
| 7,037,045 | B2 * | 5/2006 | Jones | E02D 5/523 405/249 |
| 7,261,114 | B2 * | 8/2007 | Karasin | A61H 3/00 135/85 |
| 8,342,544 | B1 * | 1/2013 | Blewett | B62B 3/022 211/189 |
| 8,424,899 | B1 * | 4/2013 | Larson | A61G 1/0231 280/640 |
| 9,131,779 | B2 * | 9/2015 | Jin | A47B 19/124 |
| 9,364,093 | B2 * | 6/2016 | Williams | A47B 91/005 |
| 9,629,770 | B1 * | 4/2017 | Dyer | A61G 7/1074 |
| 2002/0033307 | A1 | 3/2002 | Mobley et al. | |
| 2003/0079518 | A1 * | 5/2003 | Tolkamp | B21D 5/02 72/389.5 |
| 2005/0254889 | A1 | 11/2005 | Roepke et al. | |
| 2007/0029747 | A1 * | 2/2007 | Islo | B60F 3/0069 280/47.35 |
| 2007/0039786 | A1 * | 2/2007 | Willis | B60B 33/0026 188/1.12 |
| 2010/0044164 | A1 * | 2/2010 | Thorne | B62B 7/002 188/1.12 |
| 2010/0044983 | A1 * | 2/2010 | Panigot | A47C 1/143 280/40 |
| 2011/0120815 | A1 | 5/2011 | Frolik et al. | |
| 2012/0126085 | A1 * | 5/2012 | Johnson | A47C 7/002 248/346.03 |
| 2012/0199423 | A1 * | 8/2012 | Heidlage | A61G 7/05 188/1.12 |
| 2013/0160237 | A1 | 6/2013 | Shih | |
| 2014/0086701 | A1 | 3/2014 | Lacroix et al. | |
| 2015/0284040 | A1 * | 10/2015 | Dombrowsky | B62D 43/04 224/42.23 |
| 2016/0272229 | A1 * | 9/2016 | Buckner | B62B 3/02 |
| 2016/0296388 | A1 * | 10/2016 | Hertz | A61G 7/05 |
| 2016/0352195 | A1 | 12/2016 | Verardi et al. | |
| 2017/0325445 | A1 * | 11/2017 | Mitchell | A01M 31/006 |

OTHER PUBLICATIONS

Response to European Search Report dated Aug. 17, 2018 for EP Application No. 17186416.8.
Response to European Search Report dated Aug. 17, 2018 for EP Application No. 17186416.8—Claims—Tracked.
Response to European Search Report dated Aug. 17, 2018 for EP Application No. 17186416.8—Claims—Clean.
Response to European Search Report dated Aug. 17, 2018 for EP Application No. 17186416.8—Description—Tracked.
Response to European Search Report dated Aug. 17, 2018 for EP Application No. 17186416.8—Description—Clean.

* cited by examiner

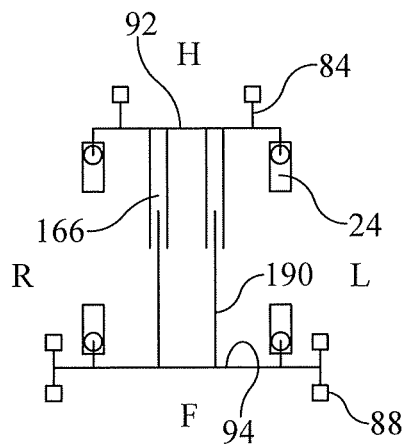
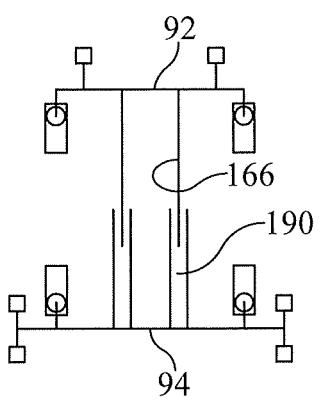
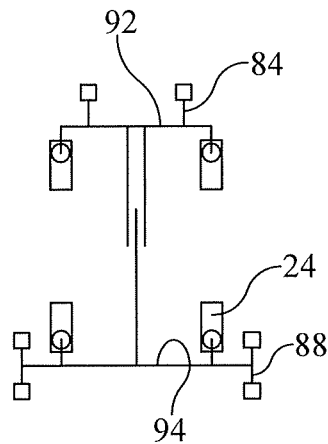
FIG. 16   FIG. 17   FIG. 18
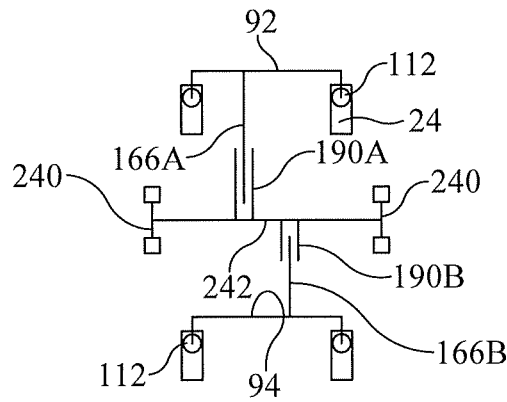
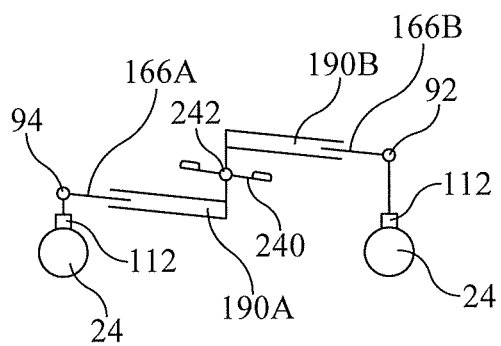
FIG. 19A   FIG. 19B
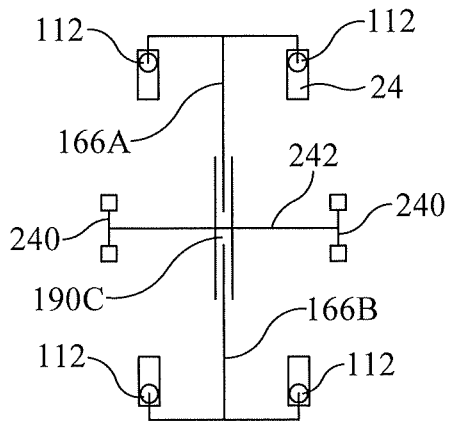
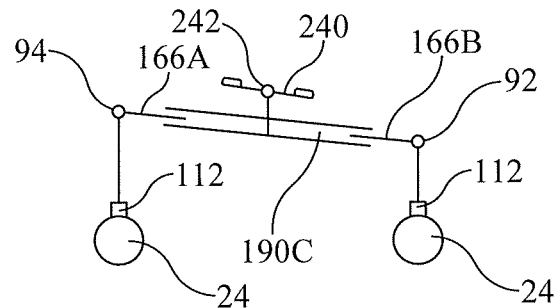
FIG. 20A   FIG. 20B

INACCURACY TOLERANT ACTUATION ASSEMBLY, ARTICLE USING THE SAME, AND METHOD OF PRODUCING THE ARTICLE

TECHNICAL FIELD

The subject matter described herein relates to a linkage assembly which is tolerant of dimensional variations that arise during manufacture of an article that employs the linkage assembly. One example article in which the linkage assembly may be beneficially applied is a hospital bed.

BACKGROUND

The production of many articles involves the fabrication of its constituent parts and subsequent assembly of those parts. The parts themselves are subject to manufacturing inaccuracies. Acceptable inaccuracies are referred to as tolerances and are usually expressed as an allowable deviation from a nominal value. For example the required diameter of a hole in a metal part might be expressed as 10 mm (the nominal value) plus or minus 0.1 mm (the tolerance). Additional inaccuracies may be introduced when the parts are assembled to produce the finished product. For example if a bolt hole in a host component is intentionally oversized in order to facilitate ease of bolting another component to the host, the uncertainty in the exact location of the bolted connection is a source of assembly inaccuracy. Additional inaccuracies may be introduced as a result of production process steps not related to component fabrication or assembly. For example, if the bed includes a scale for determining patient weight, one step in the production sequence may be to apply a known weight to the bed in order to calibrate the scale. The application of the weight may cause product components to "settle out" or become seated relative to each other thereby contributing to or reducing the previously accumulated inaccuracies.

The operation of certain components and subassemblies of a product may be adversely affected by the accumulation of inaccuracies such as those described above. Taking a typical hospital bed as an example, the bed includes a set of four casters, one at each corner the bed frame. The casters enable a caregiver to easily roll the bed from place to place. The bed also includes a braking system. On most beds the braking system is not intended to decelerate a moving bed but instead is intended to lock one or more of the casters to immobilize the bed against inadvertant or unauthorized movement. When it is desired to move the bed, the caregiver releases the brake. The braking system includes one or more brake effectors. Each brake effector is associated with one of the casters. The braking system also includes at least one brake pedal operable by a user to apply and release the brake. In the interest of operational convenience and efficiency hospital beds customarily include a brake pedal at each of two or more locations. A linkage and/or other components connects each brake pedal to all of the brake effectors so that operation of any brake pedal actuates all of the brake effectors. However, the accumulation of inaccuracies as described above can adversely affect operation of the braking system. For example, applying a force to one of the brake pedals may result in satisfactory actuation of some of the brake effectors but unsatisfactory actuation of others. An unsatisfactorily actuated brake effector may not engage the caster, may engage the caster in a way that is inadequate for immobilizing the bed, or may engage the caster in a way that seems to be satisfactory but can be easily disengaged from its caster by a minor disturbance. Even if all the effectors engage their casters satisfactorily, the engagement may be noticeably unsynchronized causing the caregiver to lack confidence in the braking system and to form a negative impression of the product.

SUMMARY

The present invention may comprise one or more of the features recited in the appended claims and/or one or more of the following features or combinations thereof. Features similar to or the same as features already described may be identified by the same reference numerals already used or by similar reference numerals. The described embodiments exhibit considerable left to right symmetry. Therefore, the following description uses the same reference numeral for corresponding left and right elements, with a suffix L or R appended when necessary to distinguish between them.

An embodiment of an actuation assembly system includes a torque input element, a torque output element longitudinally spaced from the input element, and a transfer assembly connecting the torque input element to the torque output element. The transfer assembly includes a connector assembly which includes a first connector having a proximate end closer to either the torque input element or the torque output element and a connector portion further from that same element. The connector assembly also includes a second connector having a proximate end closer to the other of the torque input element and the torque output element and a connector portion further from that same element. The connector portions are selectively joinable to each other to either permit or resist relative longitudinal translation of the first and second connectors.

In one embodiment, the selective joinability of the connectors causes the connector assembly to have first and second lengths. The first length LV is variable between a short length $LV_{SHORT}$ and a long length $LV_{LONG}$. The second length LF is a fixed length whose dimension is no shorter than $LV_{SHORT}$ and no longer than $LV_{LONG}$.

An embodiment of an article which employs the linkage includes a frame having rolling elements extending therefrom to impart movability to the article. The article also includes a torque input element, a torque output element longitudinally spaced from the torque input element, and a brake effector responsive to the torque output element to apply a braking influence to one of the rolling elements. The embodiment of the article also includes a transfer assembly connecting the torque input element to the torque output element. The transfer assembly includes a first connector extending longitudinally away from either the input element or output element and a second connector extending longitudinally away from the other of the input element and output element. The first and second connectors are loosely joinable to each other to accommodate variation in longitudinal separation between the torque input element and the torque output element, and tightly joinable to each other to synchronize operation of the output element with the input element.

When the linkage is used as a component of a product, the connector portions are initially joined together loosely during product production. The loose connection, and the accompanying longitudinal translatability of the connectors relative to each other, allows the connector assembly to self-adjust to the accumulation of inaccuracies. After production has proceeded to a production threshold, the connectors are tightly joined together to resist relative longitudinal translation of the first and second connectors thereby "locking in" the self adjustment. As used herein, the production threshold is the stage of production after which no additional accumulation of inaccuracies that would adversely affect the operation of the linkage are expected to emerge.

BRIEF DESCRIPTION OF THE DRAWINGS

The foregoing and other features of the various embodiments of the linkage assembly, article using the linkage assembly, and method of producing the article described herein will become more apparent from the following detailed description and the accompanying drawings in which:

FIGS. 16-20B are schematic plan views showing various embodiments of the brake actuation assembly.

DESCRIPTION

Figure 1:
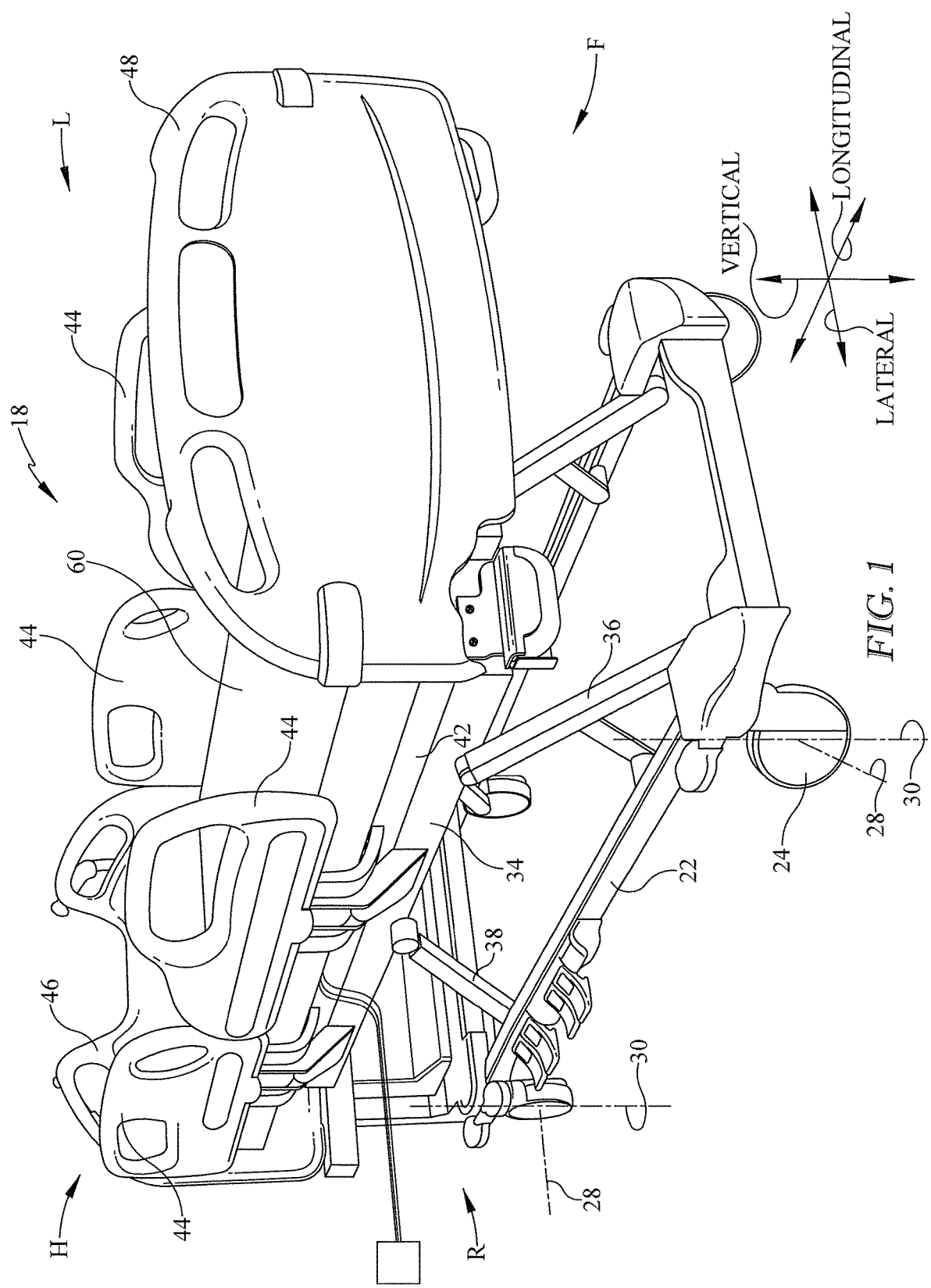
FIG. 1 is a perspective view of a typical hospital bed showing commonplace features of such beds.

Referring to FIG. 1 a typical hospital bed 20 extends longitudinally from a head end H to a foot end F and laterally from a left side L to a right side R. Left and right are taken from the perspective of a supine patient or occupant of the bed. The components of the bed include a base frame 22 with casters 24 or other rolling elements extending therefrom to support the bed on the floor and to impart mobility to the bed. The casters are rotatable about a caster roll axis 28 and pivotable about a caster pivot axis 30. The bed also includes an elevatable frame 34 connected to the base frame by movable links such as links 36 and 38. Actuators, not shown, adjust the elevation of the elevatable frame relative to the base frame. The bed also includes a deck 42, siderails 44, a headboard 46 and a footboard 48. A mattress 60, which may be sold separately, rests on the bed.

Figure 2:
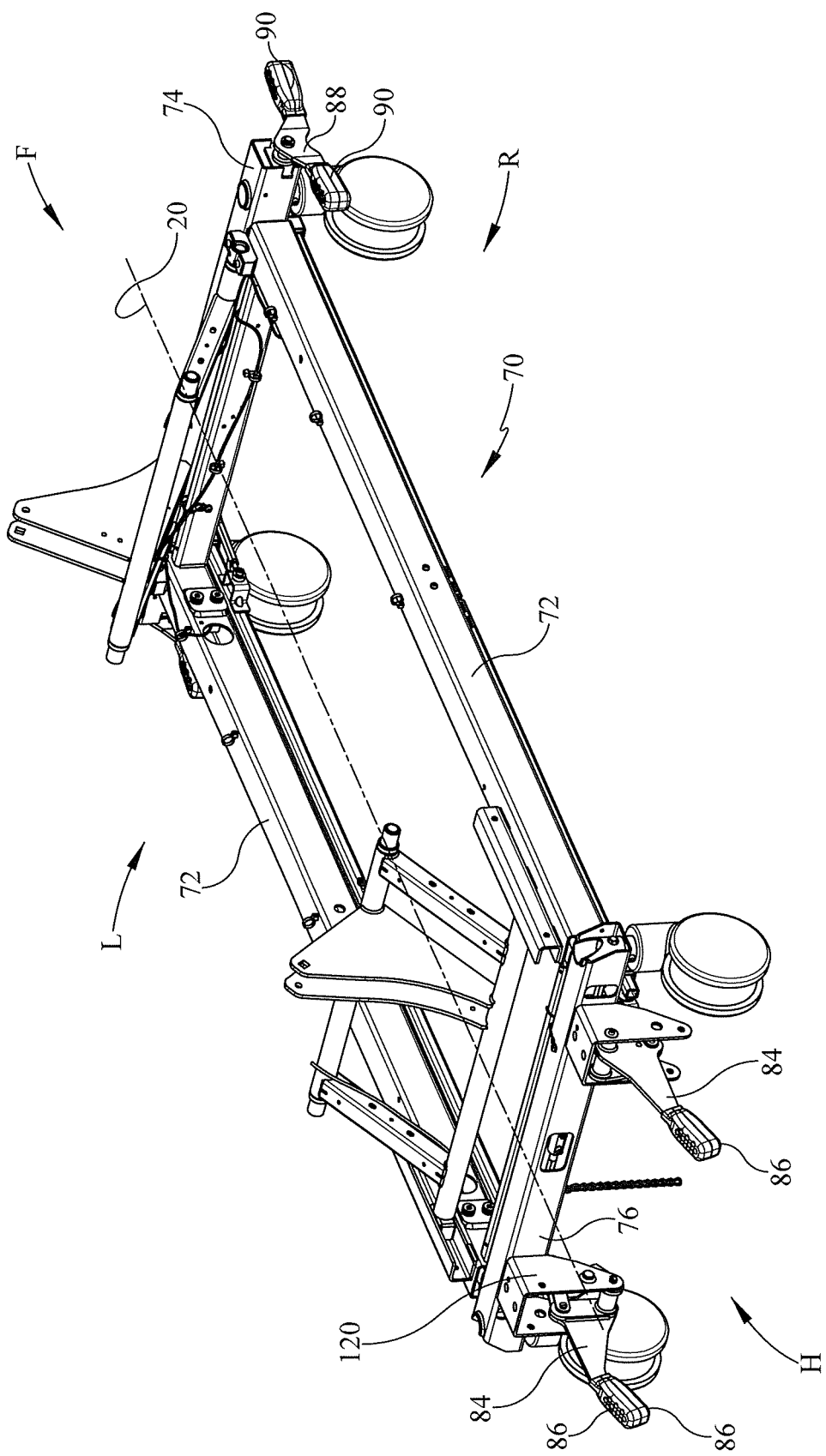
FIG. 2 is a perspective view showing a bed base frame as disclosed herein.
Figure 3:
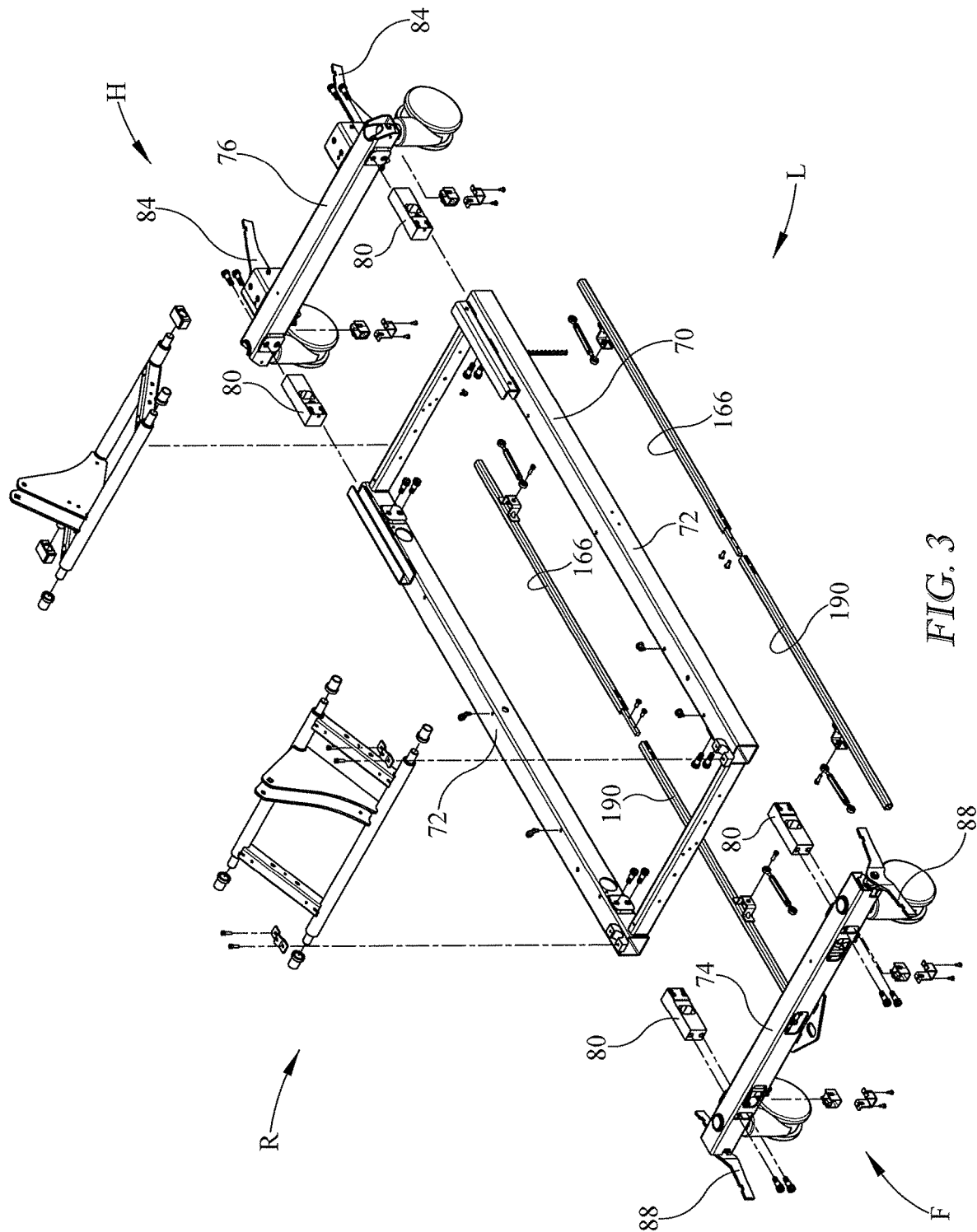
FIG. 3 is an exploded perspective view of the base frame of FIG. 2.
Figure 4:
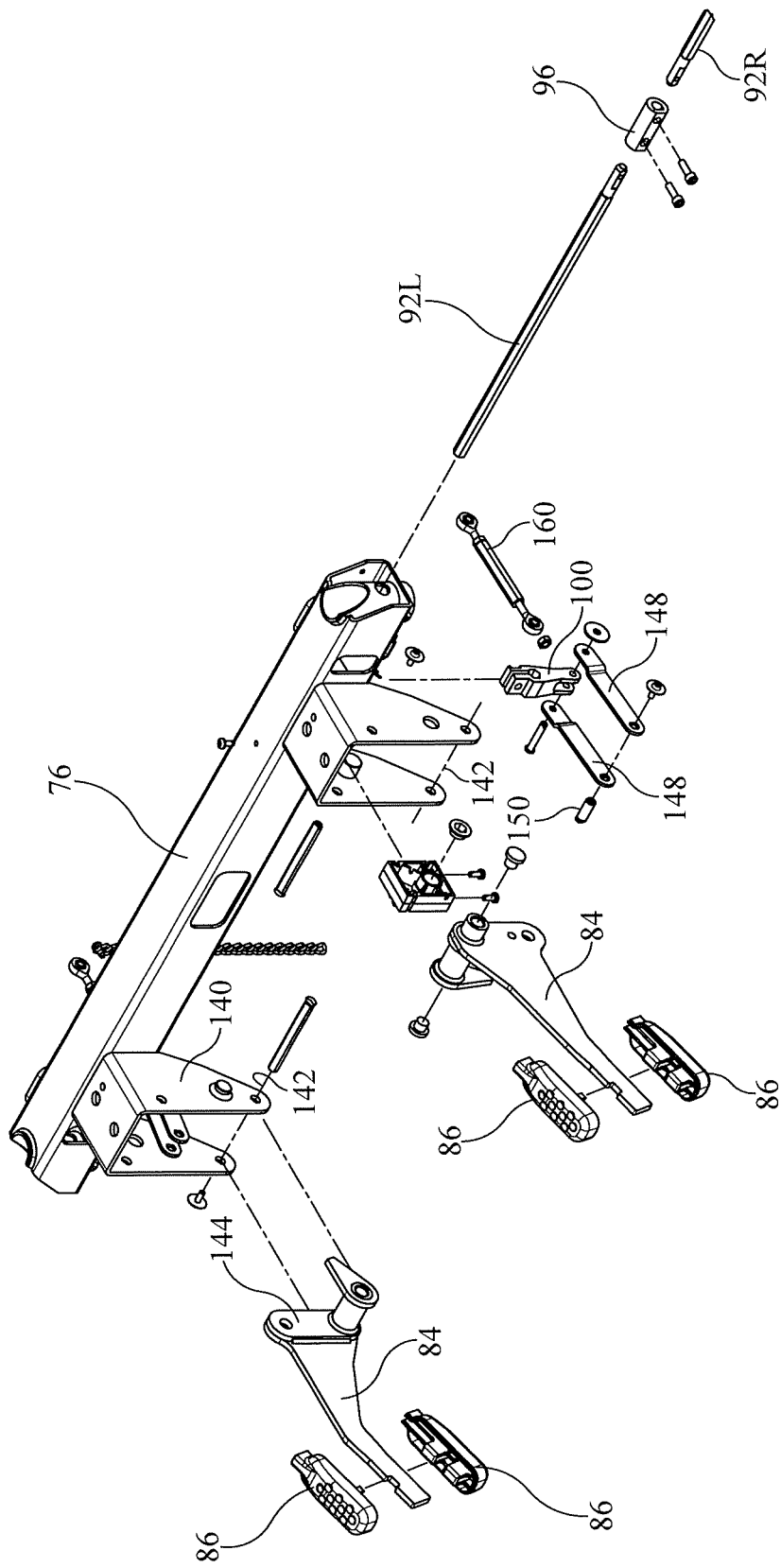
FIG. 4 is an exploded perspective view of the head end of the base frame of FIG. 3 showing components of a brake actuation system.
Figure 5:
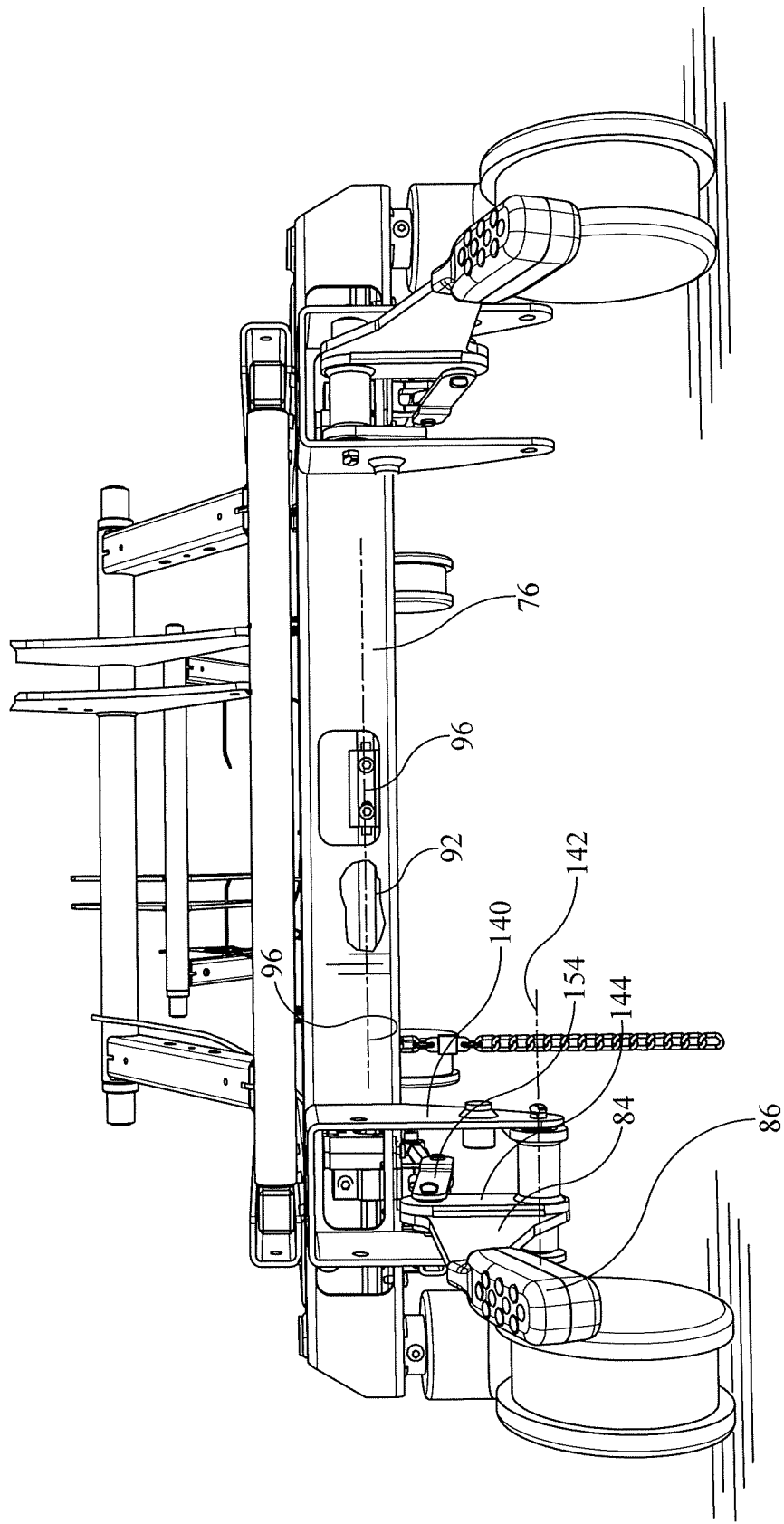
FIG. 5 is a view of the base frame from the head end thereof showing components of the brake actuation system.
Figure 6:
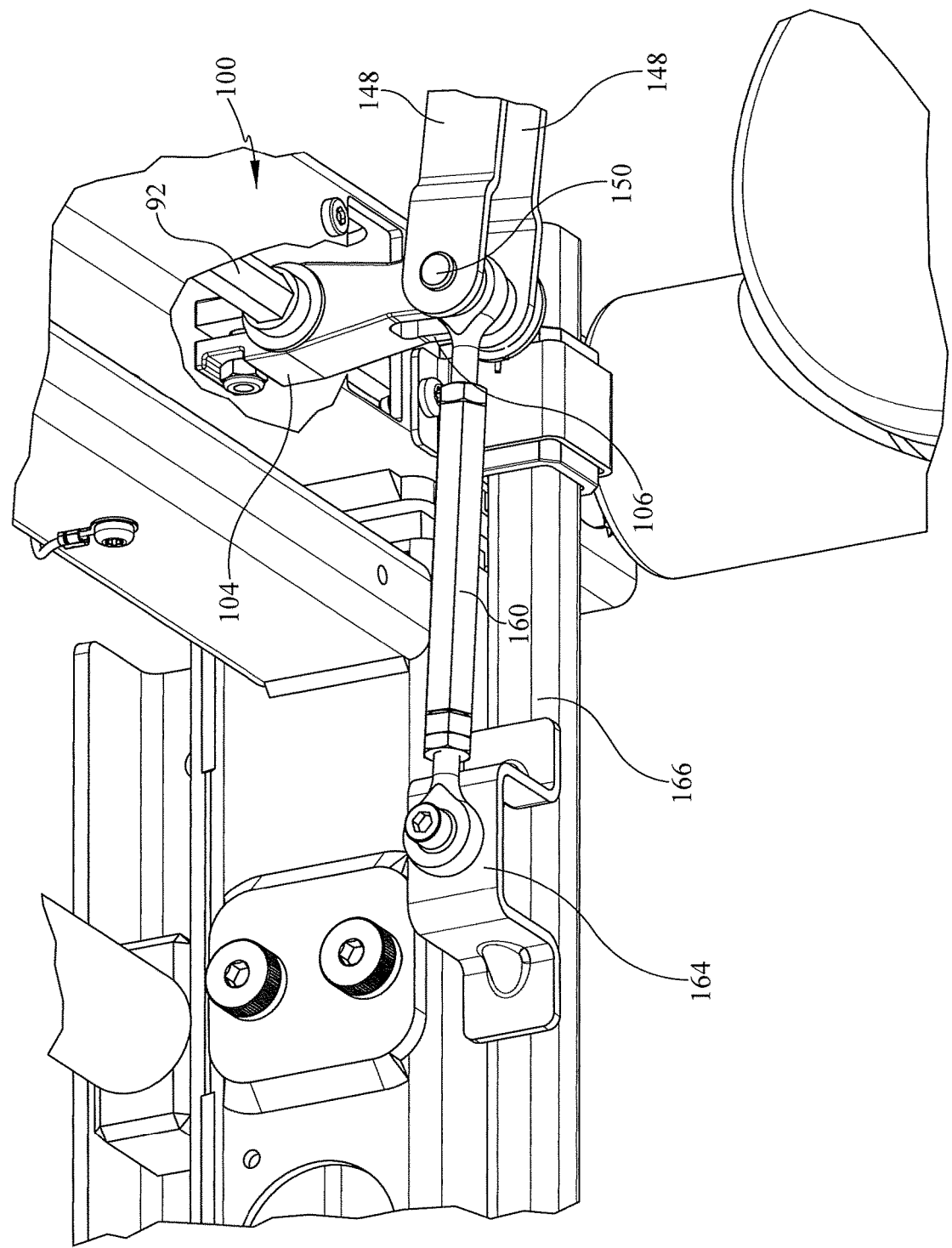
FIG. 6 is a view of components of the brake actuation system as seen by an observer looking laterally from underneath the frame near the head end of the frame.

Referring now to FIGS. 2-8, the base frame comprises a rectangular framework 70 having left and right rails 72, a foot end cross beam 74, and a head end cross beam 76. FIG. 2 shows a longitudinally extending frame centerline 78. Load cells 80 at the corners of the frame extend between each rail 72 and the adjacent cross beam 74 or 76 to provide the bed with a scale function to monitor an occupant's weight. The weight of the base frame, the weight of any components supported by the base frame (e.g. the elevatable frame, deck, mattress, siderails) and the weight of the bed occupant, if present, are transferred to the casters by way of the load cells. Each load cell outputs a signal indicative of the weight imposed on it. In practice, the weight reading signal is zeroed before an occupant enters the bed so that the resultant weight reading represents only the weight of the occupant.

The bed also includes a braking system. The components of the braking system are described below. These components include an actuation assembly, a brake effector for applying a braking influence to an associated caster, a set of head end pedals 84 each of which includes an upper and lower footpad 86, and a set of foot end pedals 88 each of which includes a pair of upper and lower footpads 90.

The actuation assembly includes a laterally extending head end rod 92 and a laterally extending foot end rod 94. Each rod 92, 94 has a hexagonal cross section and therefore may be referred to as a hex rod. Each hex rod of the illustrated embodiment is a two section rod comprised of a left section 92L or 94L and a right section 92R or 94R. The left and right sections of each rod are corotatably coupled together by a coupler 96 fastened by screws to the left and right rod sections.

Figure 7:
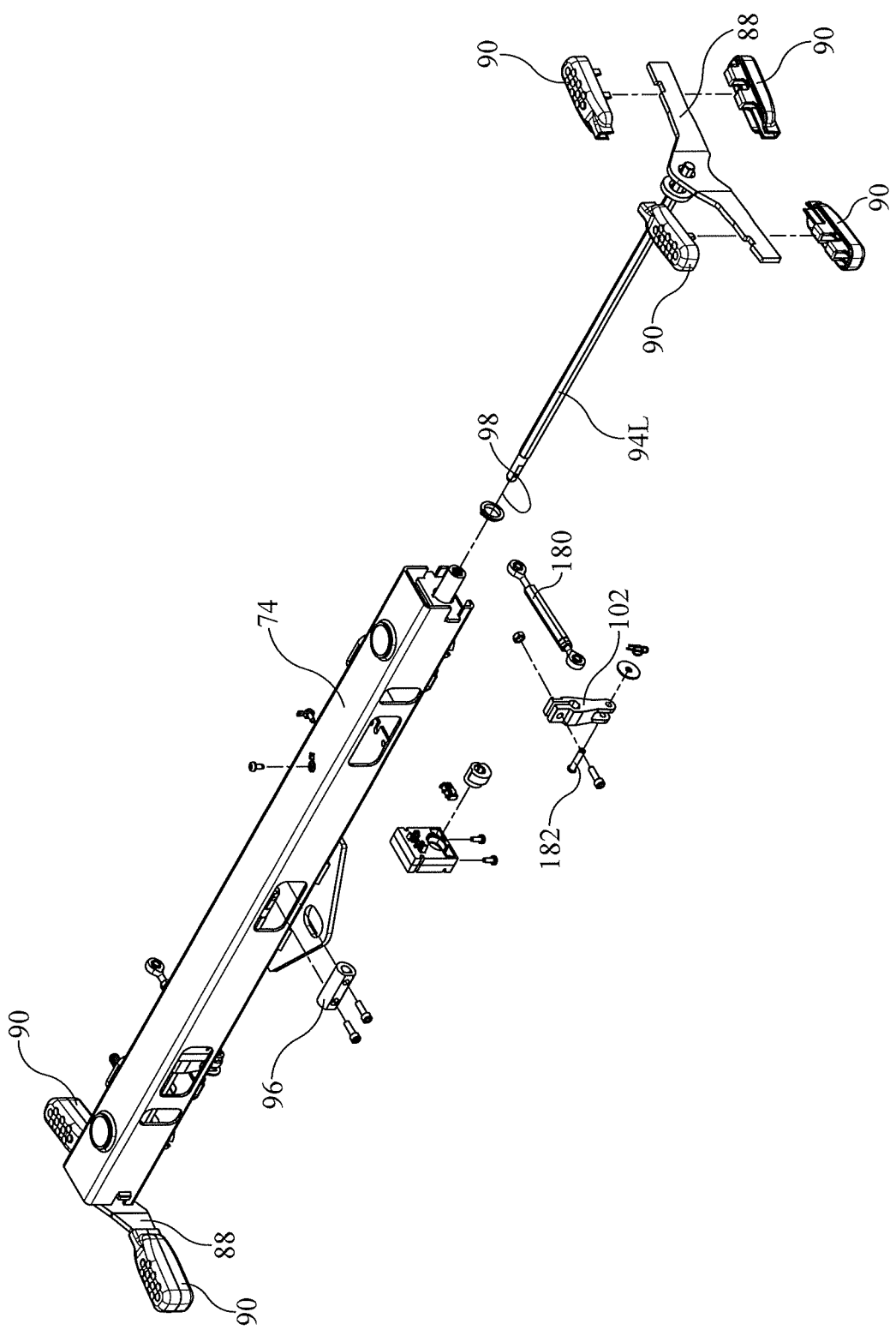
FIG. 7 is an exploded perspective view of the foot end of the base frame of FIG. 3 showing components of the brake actuation system.
Figure 8:
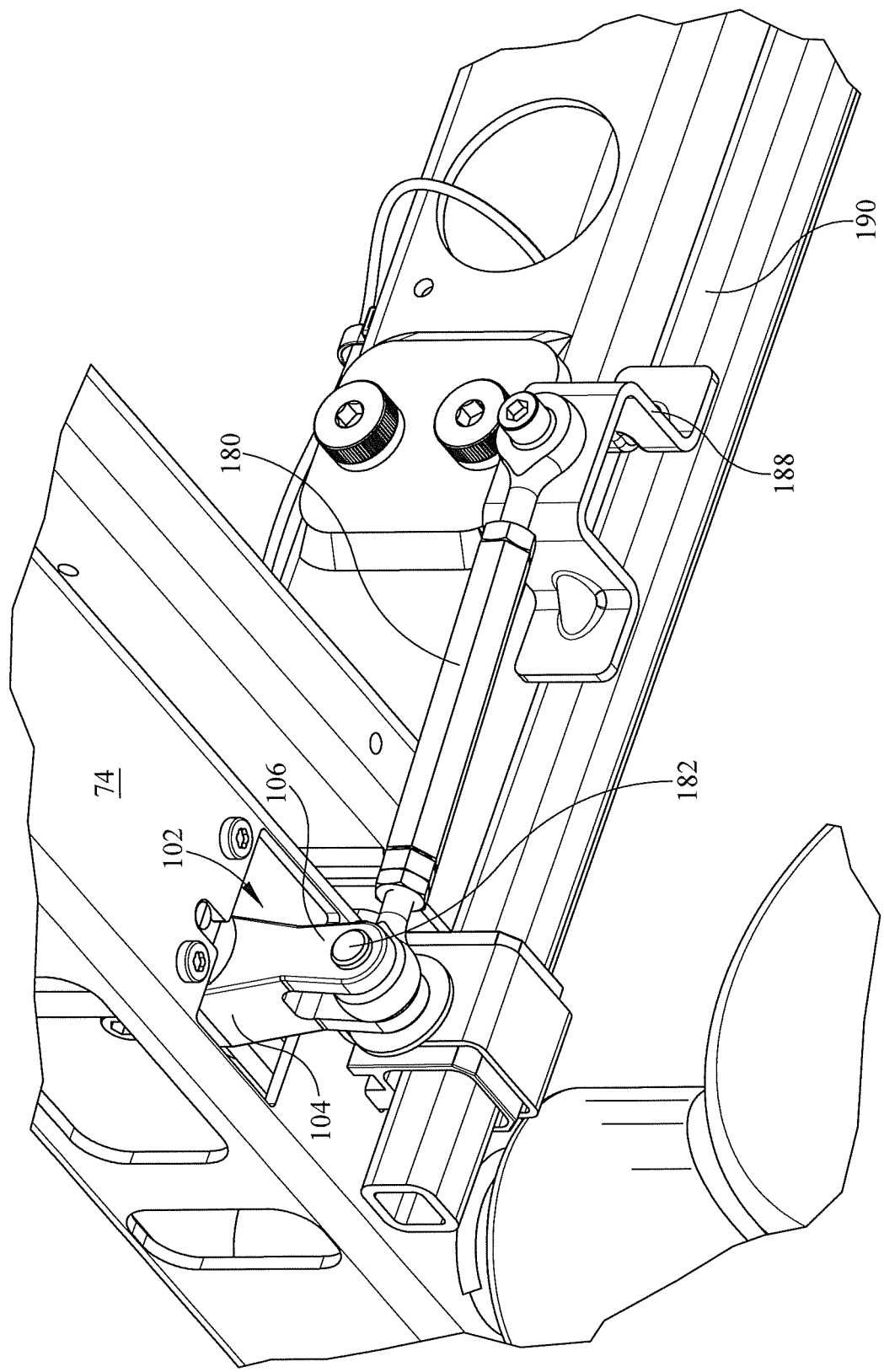
FIG. 8 is a view of components of the brake actuation system as seen by an observer looking laterally from underneath the frame near the foot end of the frame.

The braking system actuation assembly also includes a transfer linkage assembly comprising head end hex clamp 100 (FIGS. 4 and 6) and a foot end hex clamp 102 (FIGS. 7 and 8). The clamps are referred to as hex clamps because the clamp portion includes hexagonal opening which is congruent with the cross section of hex rod 92 or 94. As seen best in FIGS. 6 and 8, each clamp has a clamp portion 104 and a clevis portion 106. Clamp portion 104 of head end clamp 100 fits snugly around head hex rod 92. Clamp portion 104 of the foot end clamp 102 similarly fits snugly around foot hex rod 94.

Figure 9:
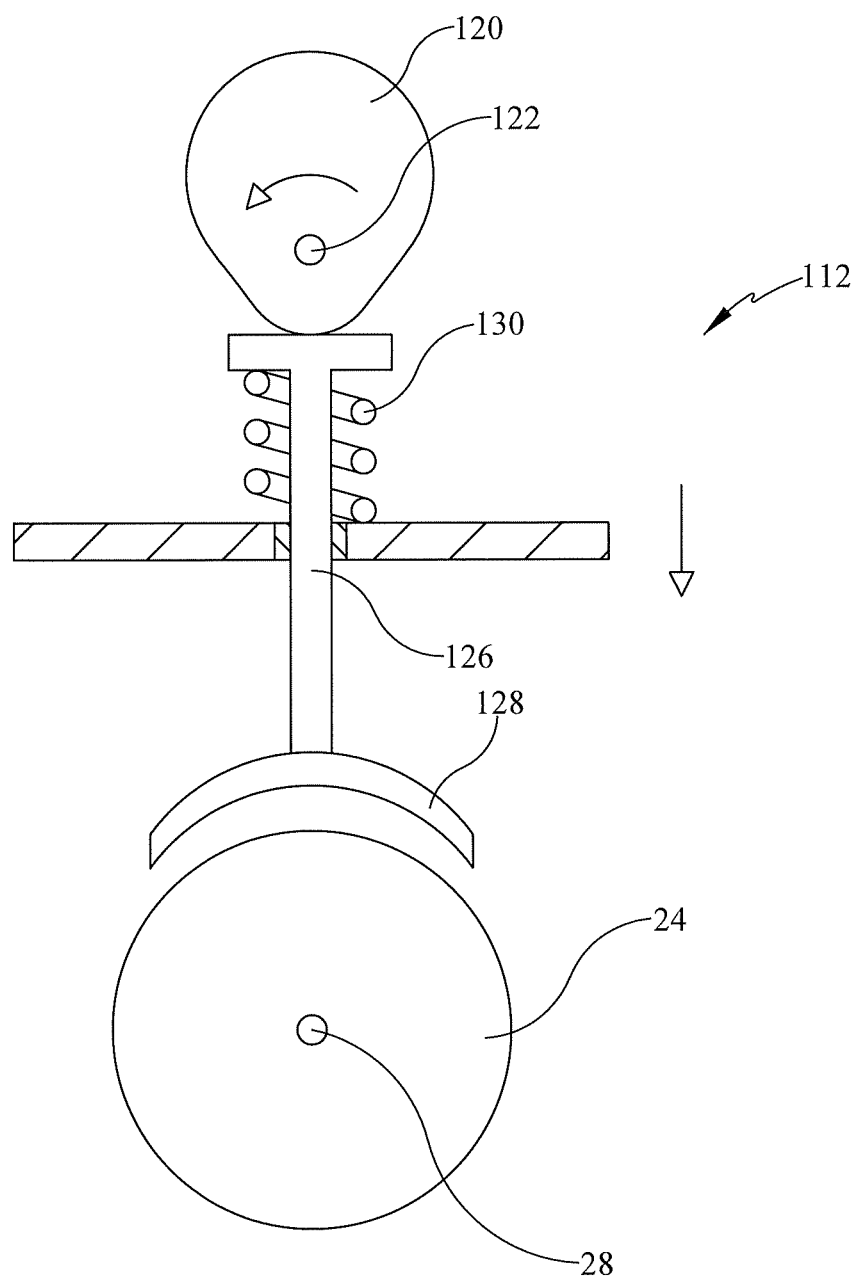
FIG. 9 is a schematic side elevation view of an example brake effector.

An example braking system brake effector 112 is shown schematically in FIG. 9. The example brake effector includes a cam 120, which is rotatable about a cam axis 122, a piston-like cam follower 126 having a brake shoe 128, and a spring 130 which biases the follower upwardly. When a user causes the cam to rotate so that its wider end presses down against the follower, the brake shoe moves towards and then bears against the rim of caster 24 to prevent the caster from rotating about its own axis 28. The braking influence is the friction between the brake shoe and the caster rim. The inventive arrangement described herein is applicable to other types of brake effectors including those whose braking influence may arise from phenomena other than friction. In one embodiment a brake effector is provided for each of the four casters.

Figure 10:
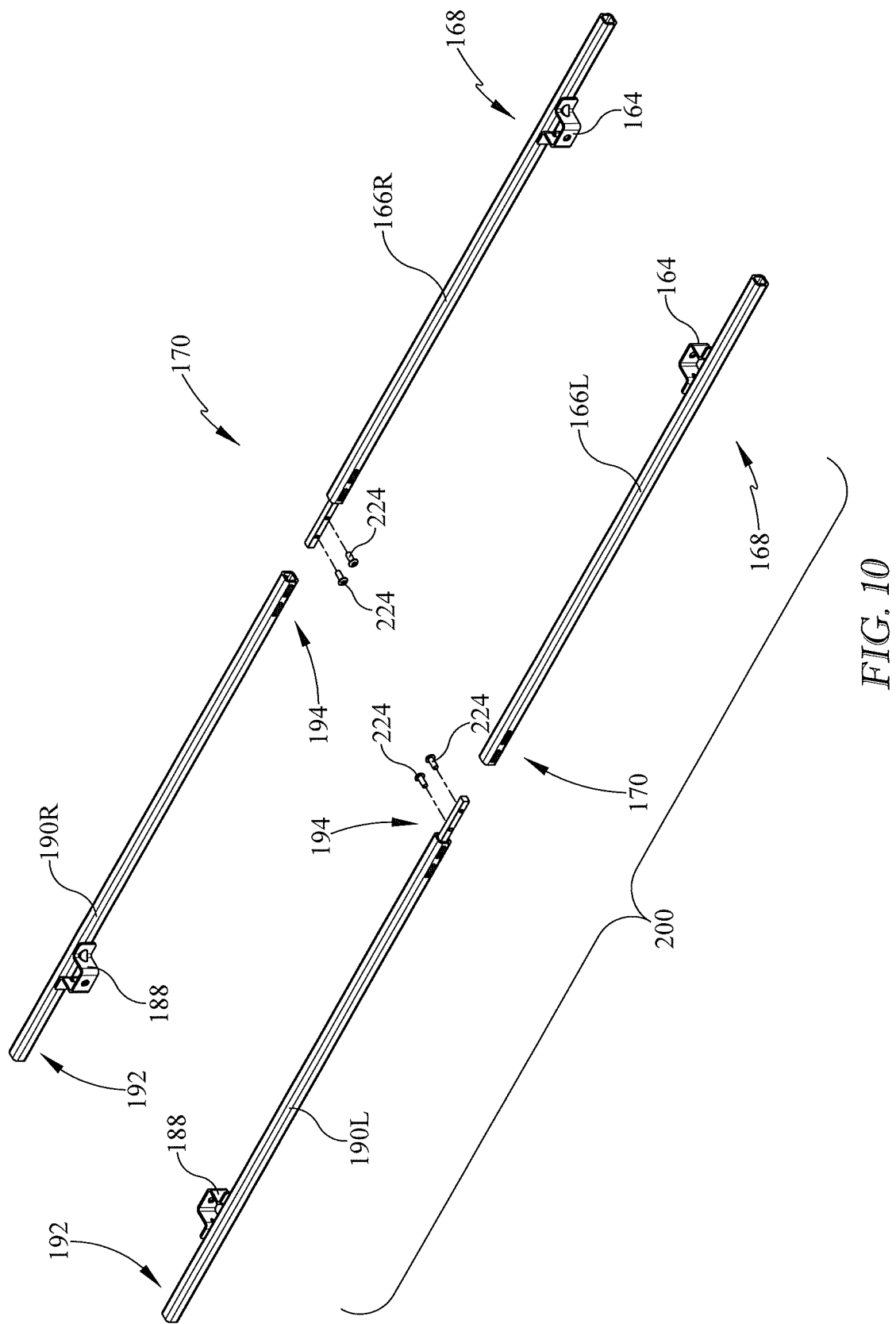
FIG. 10 is an exploded view showing left and right connector assemblies of the brake actuation system, each connector assembly comprising first and second connectors.

Each head end pedal 84 is pivotably supported on a bracket 140 extending downwardly from the head end cross beam 76 and is pivotable about head end pedal pivot axis 142. A bellcrank arm 144 extends radially away from the pivot axis. The transfer linkage assembly includes two parallel links 148. One end of each of the two parallel links is connected to the bellcrank arm at a location on the arm remote from the pedal axis. The other end of each of the parallel links is connected to clevis portion 106 of clamp 100 by clevis pin 150. The transfer linkage assembly also includes a head end turnbuckle link 160 having a ball joint at each end thereof. Clevis pin 150 extends through the ball joint at one end of the turnbuckle link to connect the turnbuckle link to clamp 100. The other end of the turnbuckle link is connected to a mounting bracket 164 which projects laterally from a longitudinally extending first connector 166. Referring to FIG. 10, the first connector has a proximate end 168, which is the end closer to the head end hex rod 92, and a connector portion 170, which is further from the head end hex rod. In the illustrated embodiment the connector portion is near the end of the connector opposite the proximate end.

Each foot end pedal 88 is mounted on foot end hex rod 94. The transfer linkage assembly includes a foot end turnbuckle link 180 having a ball joint at each end thereof. A clevis pin 182 extends through the ball joint at one end of the turnbuckle link to connect the turnbuckle link to the clevis portion 106 of foot end clamp 102. The other ball joint of the turnbuckle link is connected to a mounting bracket 188 which projects laterally from a longitudinally extending second connector 190. As seen best in FIG. 10, the second connector has a proximate end 192, which is the end closer to the foot end hex rod 94, and a connector portion 194, which is further from the foot end hex rod. In the illustrated embodiment the connector portion is near the end of the connector opposite the proximate end.

As described in more detail below, the first and second connectors are selectively joinable to each other to either permit or resist longitudinal translation of the first and second connectors relative to each other. When joined together the first and second connectors make up a connector assembly 200. The connector assembly, together with parallel links 148, turnbuckle links 160, 180 and hex clamps 100, 102 make up the transfer linkage assembly. The transfer assembly connects the head end hex rod to the foot end hex rod.

A user, such as a caregiver, may operate the braking system from any one of the four brake pedals by applying a substantially vertical force (i.e. an input force) to the brake pedal of choice. If he uses one of the head end pedals 84, head end hex rod 92 is considered to be and can be referred to as a torque input element. The input force rotates the head end hex rod about its axis 96. The transfer assembly transfers force and motion to the foot end hex rod 94 causing the foot end hex rod to rotate about its axis 98. Accordingly, the foot end hex rod is considered to be and can be referred to as a torque output element. Rotation of the torque input element causes the brake effectors associated with the head end casters to apply a braking influence to those casters. Similarly, rotation of the torque output element causes the brake effectors associated with the foot end casters to apply a braking influence to those casters.

If the user chooses to use one of the foot end brake pedals, the foot end hex rod is considered to be and can be referred to as a torque input element, and the head end hex rod is considered to be and can be referred to as a torque output element.

Figure 11:
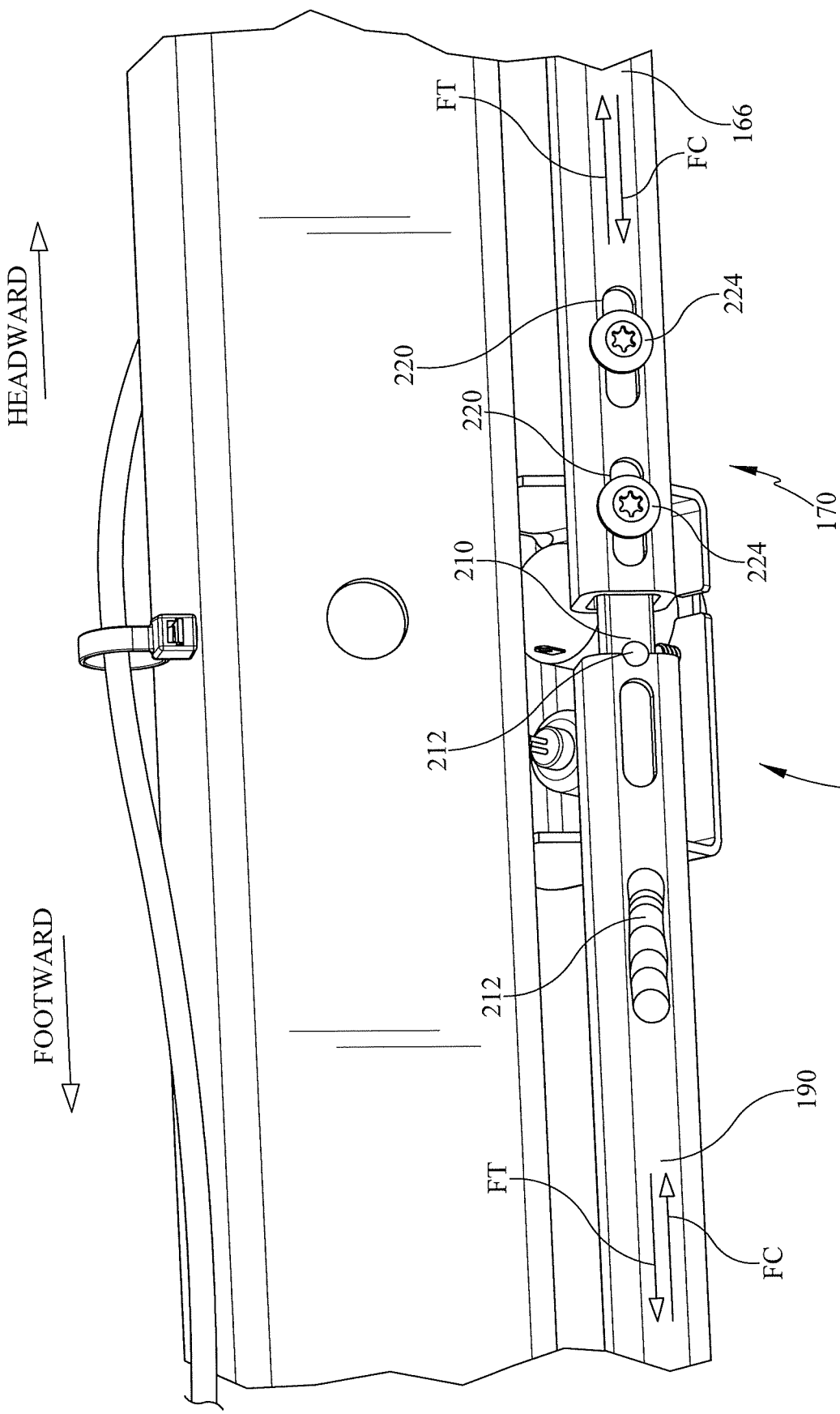
FIG. 11 is a view of one of the connector assemblies of FIG. 10 showing connector ends of the connectors as seen by an observer looking laterally away from the longitudinal centerline of the base frame.
Figure 12:
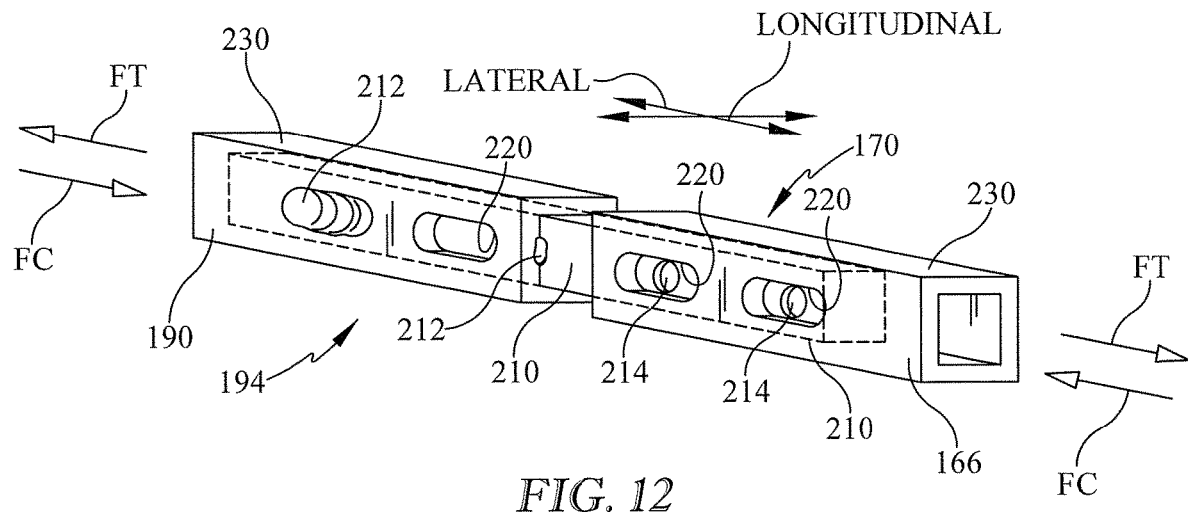
FIG. 12 is a schematic perspective view showing one possible configuration of the connector ends of the connectors.
Figure 13:
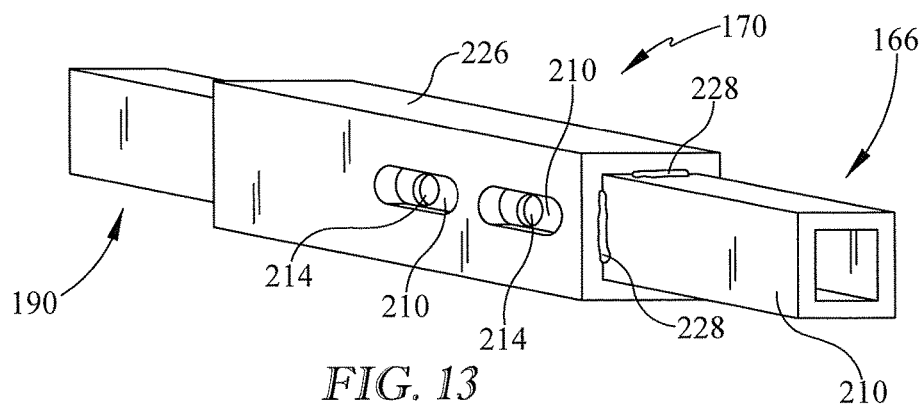
FIG. 13 is a schematic perspective view showing another possible configuration of the connector ends of the connectors.

The selective joinability of the first and second connectors is illustrated in FIGS. 11-13. In a variant shown in FIGS. 11-12, connector portion 194 of second connector 190 is an internal or male portion such as a bar 210 attached by welds 212 to a sleeve-like portion of second connector 190. The second connector portion 194 includes at least one threaded hole 214. The threaded hole penetrates into the second connector portion. Alternatively the threaded hole may penetrate all the way through the second connector portion. Either way the direction of the hole (which is the direction a screw would advance if threaded into the hole) is a direction other than the longitudinal direction. The illustrated hole extends in the lateral direction.

Figure 14:
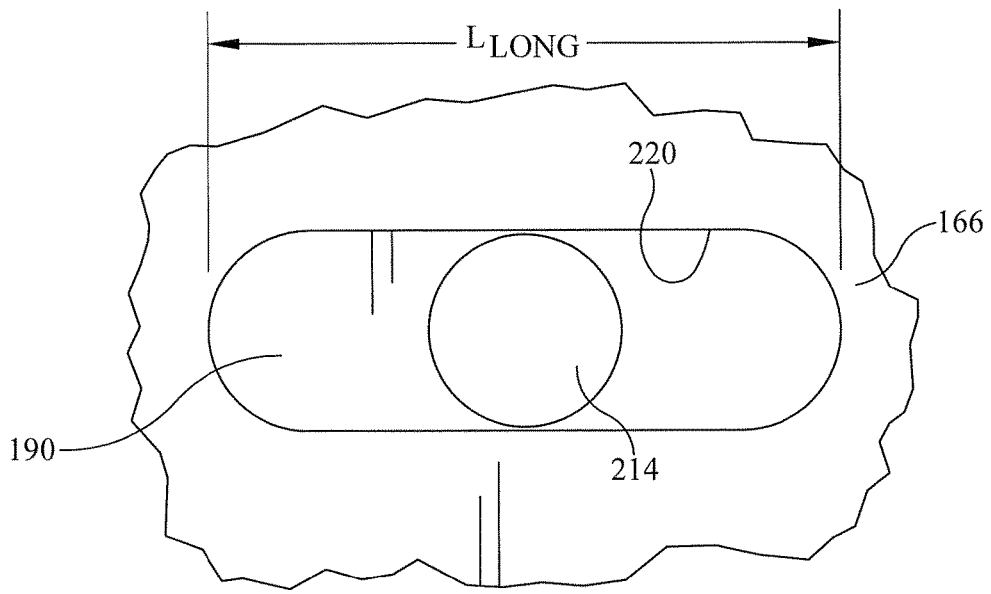
FIG. 14 is a schematic side elevation view similar to that of FIG. 12 showing a threaded circular hole in one of the connectors and an elongated hole in the other connector.

The connector portion 170 of the first connector 166 is an external or female portion which receives the male connector portion of the second connector. Connector portion 170 includes an elongated hole 220 for each of the one or more threaded holes 214 in the second connector portion. Each hole 220 is longitudinally elongated in comparison to the threaded hole, i.e. the long dimension $L_{LONG}$ of the elongated hole exceeds the diameter of the threaded hole. Each elongated hole is positioned on the first connector so that the entirety of the threaded hole, when viewed in the nonlongitudinal direction in which it extends, is circumscribed by a projected perimeter of the elongated hole irrespective of whether the connector portions are joined to each other to permit or to resist relative longitudinal translation between them. In other words, as seen in FIG. 14, if the holes were projected onto the same plane, hole 214 would be entirely within the perimeter of hole 220.

A threaded fastener such as a screw 224 extends through the elongated hole 220 and into the threaded hole 214 in order to effect the selective joinability of the connector portions. The screw may be loosely installed to loosely connect the connectors to each other. In this context "loosely" means loose enough to permit the first and second connectors to translate longitudinally relative to each other when connectors 166, 190 are subject to forces such as FT which tends to pull the connectors away from each other or FC which tends to push the connectors toward each other. The concept of loose screw installation and a loose connection includes installing the screw with a modest amount of torque as well as the limit case of simply installing the screw a few turns into the threaded hole but not so far as to tighten its head against the first connector (i.e. the modest torque is essentially zero newton-meters). Applicants believe that the zero torque limit case is at least as satisfactory as the option of applying a non-zero torque. The screw may also be tightened with a greater amount of torque to tightly connect the connectors to each other. In this context "tightly" means tight enough to prevent the first and second connectors from translating longitudinally relative to each other when connector assembly 200 is subject to a compression FC or tension FT of at least the magnitude expected to be encountered when the bed frame is in service and being used for its intended purpose.

FIG. 13 shows a variant in which the female connector portion includes a sleeve 226 attached by welds 228 to a bar 210.

As seen in FIG. 10, on one side of the frame the male connector may extend away from rod 92 and the female connector may extend away from rod 94. On the other side of the frame the male connector may extend away from rod 94 and the female connector may extend away from rod 92.

Figure 15:
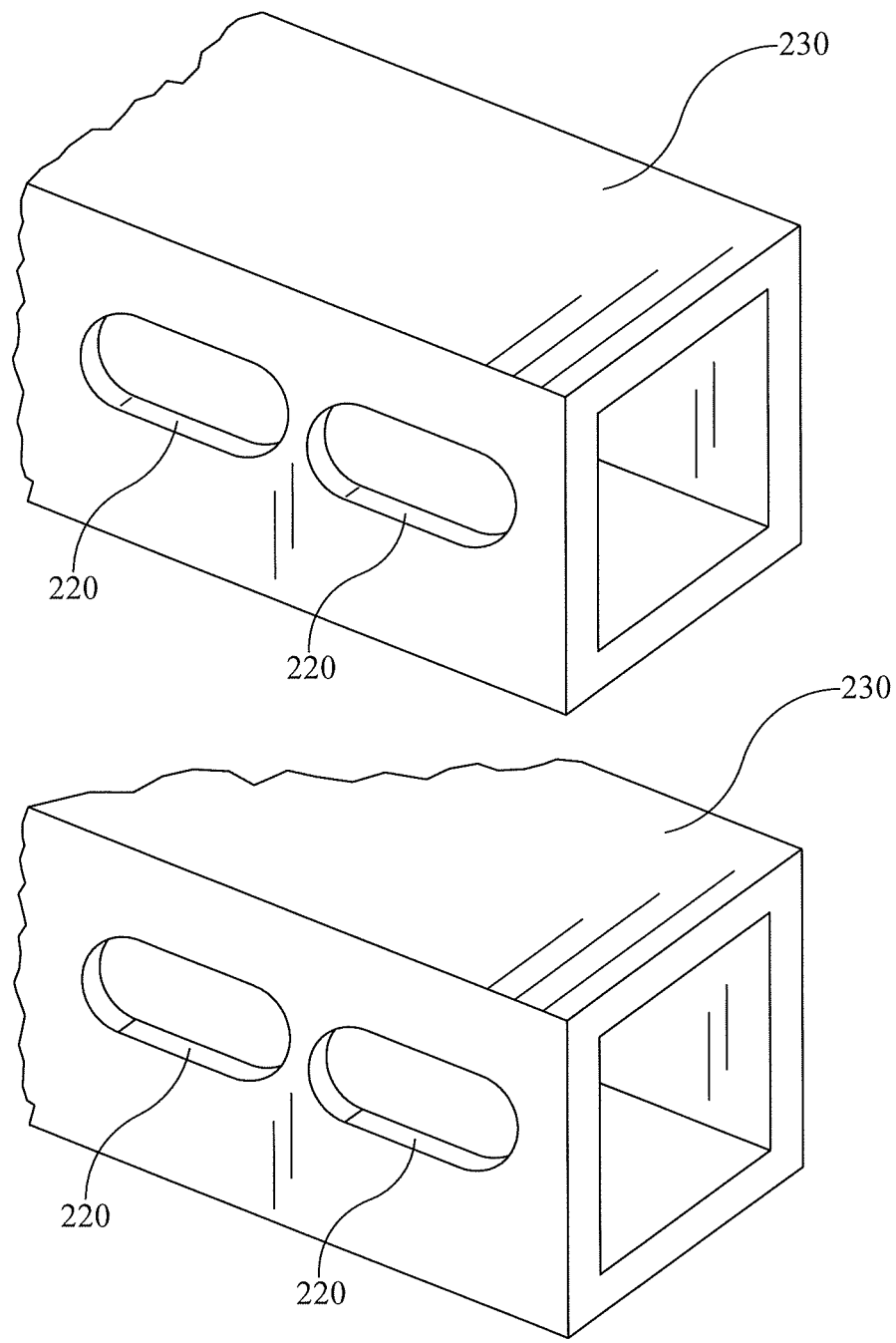
FIG. 15 is a schematic perspective view presented in the context of fabricating the first and second connectors.

Referring to FIGS. 12 and 15, in practice it is advantageous to fabricate the first and second connectors from identical pieces of stock 230 and to form identical elongated holes 220 in each piece. Subsequently, a bar 210 with threaded holes 214 is welded to one of the two pieces causing that piece to assume its identity as a male connector. The elongated hole in the male connector may be used as a site for one of the welds 212 joining the piece of stock 230 to the bar 210.

Alternatively, as seen in FIG. 13, the first and second connectors may be fabricated from identical pieces of stock 230 having threaded circular holes 214. Sleeve 226 having elongated holes 220 is welded (e.g. at welds 228) to one of the two pieces 230 causing that piece to assume its identity as a female connector.

The steps of manufacturing the bed include constructing a subassembly which includes frame 22, a laterally extending torque input element 92, a laterally extending torque output element 94 longitudinally spaced from the torque input element, and a transfer assembly which connects the torque input element to the torque output element. The transfer assembly includes first and second connectors 166, 190, which are joined together longitudinally intermediate the torque input and torque output elements and which, when initially joined together, are loosely joined together to accommodate relative longitudinal movement of the first and second connectors.

The steps of manufacturing the bed also include installing additional components of the bed. For example installing the elevatable frame 34, deck 42, headboard 46 and footboard 48.

Assembly inaccuracies and fabrication inaccuracies in the constituent parts accumulate during the constructing and installing steps described above. However the loose connection between the first and second connectors allows the connector assembly to self adjust to these inaccuracies by undergoing a change of length as production progresses.

Once the production process progresses to the stage where any further production steps are not expected to result in any meaningful additional accumulation of inaccuracies that would adversely affect operation of the brake system, the connectors are tightly joined together to "lock in" the self adjustment. Because the self-adjustment compensates for the accumulation of inaccuracies that would otherwise compromise operation of the braking system, the braking system will operate more satisfactorily than if the inaccuracies were allowed to accumulate. In particular the self adjustment increases the likelihood that all the brake effectors will be satisfactorily actuated, and ensures that the operation of the output element will be more closely synchronized with the operation of the input element.

The bed may be subject to one or more additional processing steps prior to being released to a customer. For example, in the case of a bed with a scale function, i.e. with load cells and other components necessary to measure occupant weight, the bed may be subject to the application of a known weight in order to calibrate the load cells and gain confidence in their accuracy. Such application of weight or other processing may cause components of the bed to "settle out" or become seated relative to each other thereby contributing to or reducing the previously accumulated inaccuracies. Therefore the method of manufacture of the bed may also include the processing step subsequent to the installing step and prior to the step of tightly joining the connectors together. In the example of a bed with load cells, the step of installing additional components may include installing components which are necessary to carry out the weighing function such as elevatable frame 34 and deck 42, and connecting wiring between the load cells 80 and a destination for the load cell output signals such as a microprocessor. The processing step of applying weight to the bed would not be carried out until at least these and other components necessary to carry out the weighing function were installed. The step of tightly joining the connectors together is carried out after the processing step.

Figure 21:
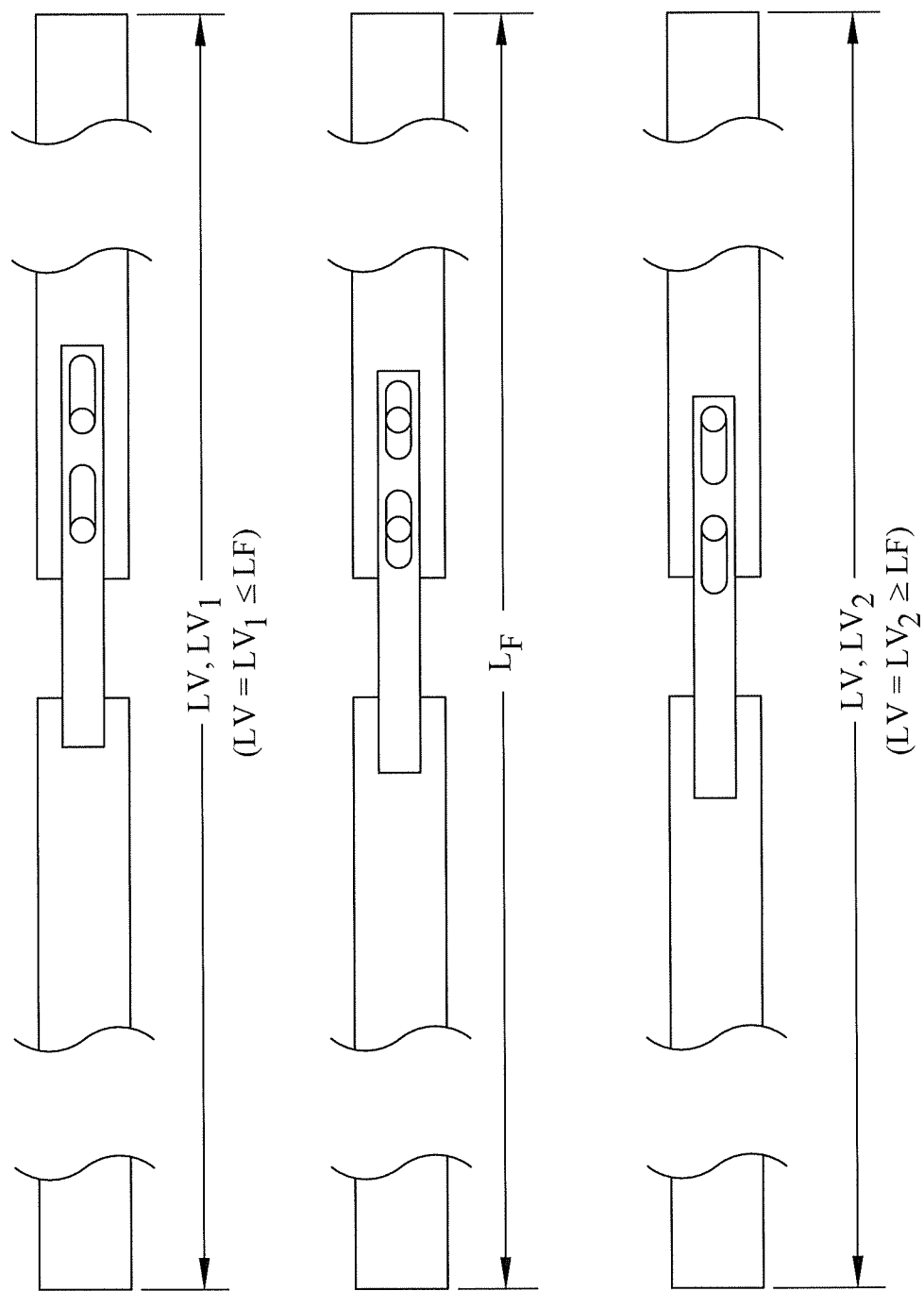
FIG. 21 is a schematic side elevation view illustrating that the connector assembly is a multiple length assembly having a first or variable length and a second or fixed length.

Referring to FIG. 21, the connector assembly can be described as a multiple length assembly having a first or variable length LV which is variable between a short length LV1 and a long length LV2, and a second or fixed length LF which is fixed at a dimension no shorter than LV1 and no longer than LV2.

FIGS. 16-20B are schematic plan views showing the above described embodiment and variations on the theme. FIG. 16 is an embodiment in which both of the male connectors extend away from foot hex rod 94 and both female connectors extend away from head hex rod 92. FIG. 17 is a variation in which the connectors with the male connector portions extend away from the head end hex rod 92 and the connectors with the female connector portions extend away from the foot end hex rod 94. FIG. 18 is a variant with a single connector assembly rather than left and right connector assemblies.

FIGS. 19A and 19B show an arrangement with only two pedals 240. The transfer linkage assembly includes a medial hex rod 242 connecting the medial pedals to each other. The medial hex rod is longitudinally between the head end and foot end hex rods 92, 94. The medial hex rod serves as the torque input element. Head and foot hex rods 92, 94 serve as first and second torque output elements which cause the brake effectors 244 to engage or disengage from their associated casters 24. A head end connector assembly comprises a first connector 166A which extends longitudinally away from head end hex rod 92 and a second connector 190A which extends away from medial hex rod 242. A foot end connector assembly comprises a first connector 166B which extends longitudinally away from foot end hex rod 92 and a second connector 190B which extends away from medial hex rod 242. As with the other embodiments one connector of the connector assembly extends away from the torque input element while the other connector extends away from the torque output element, and the connectors are selectively joined together to permit or resist relative longitudinal translation of the connectors.

FIGS. 20A and 20B show an arrangement similar to that of FIGS. 19A and 19B except that it uses a common first connector 190C instead of the dual first connectors of FIGS. 19A-19B. In this configuration the common connector extends away from the torque input element 242 while the non-common, head and foot end connectors 166A, 166B extend away from respective torque output elements. Each non-common connector is selectively joined to end of the common connector to permit or resist relative longitudinal translation of the noncommon connector and the common connector.

In FIGS. 19A-20B the casters at one end of the bed (head or foot) are left and right first casters, and the associated brake effectors are left and right first brake effectors. The casters at the other end of the bed (foot or head) are left and right second casters, and the associated brake effectors are left and right second brake effectors.

In view of the foregoing description, certain other features of the invention can now be better appreciated.

First, fastener 224 need not be a threaded fastener. Any fastener or fastening system which connects the connector portions of the connectors together in a first state of securement which permits relative longitudinal translation of the first and second connectors and a second state of securement which resists relative longitudinal translation of the first and second connectors, is satisfactory.

Figure 22:
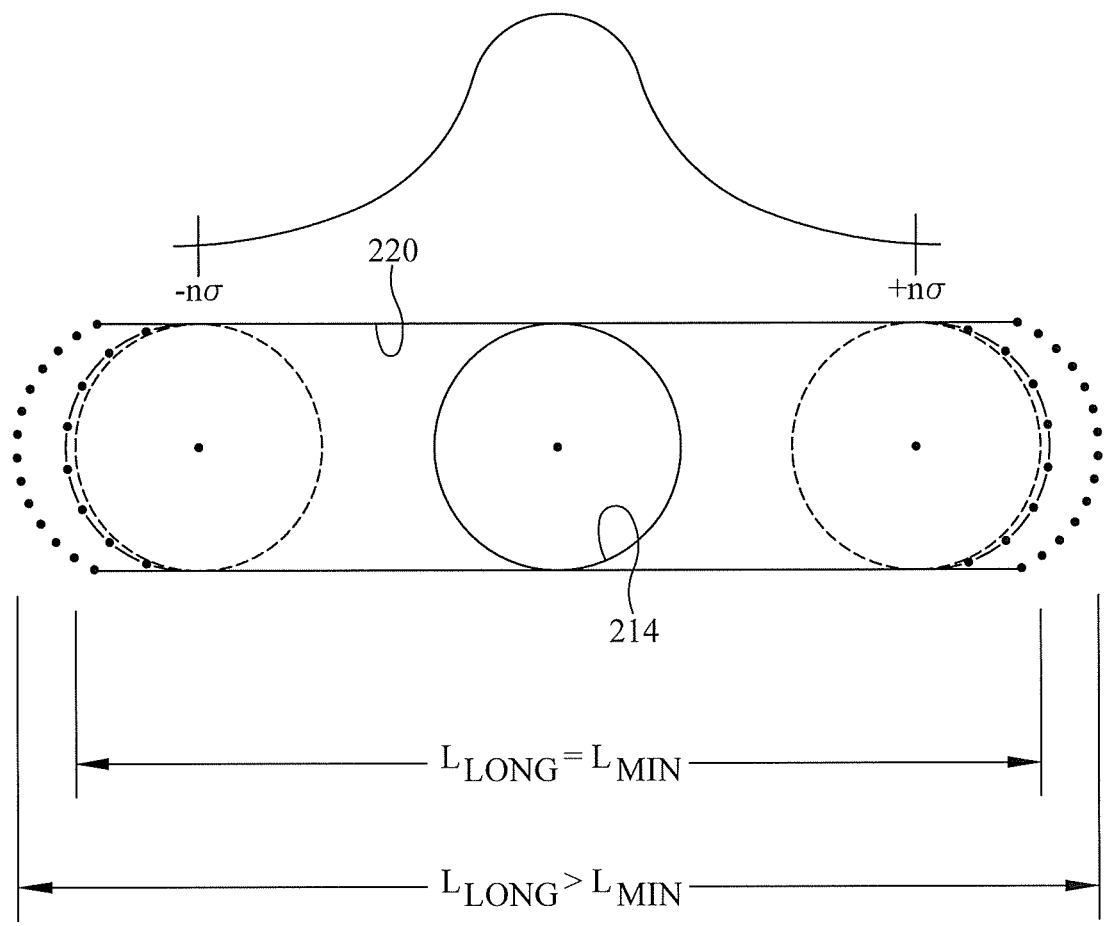
FIG. 22 is a schematic side elevation view showing options for the sizes of the elongated hole and the threaded hole of FIG. 13

Second, and referring to FIG. 22, the amount by which the long dimension $L_{LONG}$ of the elongated hole is greater than the diameter of the threaded hole is large enough that that the threaded hole remains within the projected perimeter of the elongated hole provided that a tolerance of a pre-specified magnitude is not exceeded. The pre-specified tolerance includes at least one of a component manufacturing tolerance, an assembly tolerance, and a processing tolerance such as can arise from applying weight to the bed as described above in the context of calibrating the load cells. For example if the center of threaded hole 214 is expected to fall within plus or minus n standard deviations of the center of elongated hole 220 (so that the threaded holes are at the extreme locations indicated by the dashed lines) the long dimension $L_{LONG}$ of the elongated hole would be at least $L_{MIN}$. In this example, the number of standard deviations, n, defines the prespecified tolerance. The long dimension of the elongated hole may be oversized if desired to accommodate unexpectedly large inaccuracies as illustrated by the dotted line edges.

Alternatively, dimension $L_{LONG}$ may be sized exactly with respect to the expected deviation/tolerance so that in the case of the maximum positive or negative allowable variation from nominal the headward or footward edge of the elongated hole (dash-dot edges) is line-on-line with the headward or footward edge of the threaded hole. (In the illustration, the dash-dot edges are slightly offset from the dashed lines showing the extreme positions of the elongated hole to ensure that both lines are visible to the reader.) In other words the longitudinal dimension of the elongated hole is greater than the diameter of the threaded hole by an amount large enough that the threaded hole remains exactly within the projected perimeter of the elongated hole when the actuation assembly exhibits an inaccuracy substantially equal to a tolerance of a pre-specified magnitude Third, although the above example assumes that the accumulated inaccuracies are symmetrically distributed about a mean (in which case the centers of the holes coincide with each other) the long dimension of the elongated hole can instead be established based on a nonsymmetrical distribution of inaccuracies.

Although this disclosure refers to specific embodiments, it will be understood by those skilled in the art that various changes in form and detail may be made without departing from the subject matter set forth in the accompanying claims.

The terms "substantially" and "about" may be used herein to represent the inherent degree of uncertainty that may be attributed to any quantitative comparison, value, measurement or other representation. These terms are also used herein to represent the degree by which a quantitative representation may vary from a stated reference without resulting in a change in the basic function of the subject mater at issue.

We claim:
1. An actuation assembly comprising:
a torque input element including a first hex rod;
a torque output element longitudinally spaced from the input element and including a second hex rod; and
a transfer assembly comprising a connector assembly, the transfer assembly connecting the torque input element to the torque output element, the connector assembly comprising:
a first connector having a first end and a second end, the first end being closer to one of the torque input element and the torque output element, wherein the first connector is coupled to the first hex rod via a first hex clamp and a first turnbuckle link;
a second connector having a first end and a second end, the first end of the second connector being closer to the other of the torque input element and the torque output element, wherein the second connector is coupled to the second hex rod via a second hex clamp and a second turnbuckle link; and
the first and second connectors being coupled to each other by a bridge element that extends across a gap formed between the second ends of the first and second connectors, that is permanently affixed to the second connector adjacent the second end of the second connector, and that is translationally movable relative to the second end of the first connector to either permit self adjusting relative longitudinal translation of the first and second connectors in response to accumulation of production inaccuracies occurring at a pre-threshold stage of production or to resist relative longitudinal translation of the first and second connectors.

2. The actuation assembly of claim 1 wherein the resistance to relative longitudinal translation locks in the pre-threshold self adjustment.

3. The actuation assembly of claim 1 wherein the bridging element is one of an external portion that surrounds the second ends of the first and second connectors and an internal portion that is received within a respective bore formed in each of the first and second connectors, and the bridging element is joined to the first connector by a fastener.

4. The actuation assembly of claim 3 wherein:
the bridging element is an internal portion, the internal portion includes a threaded hole that penetrates into or through the internal portion in a non-longitudinal direction;
the first connector includes a hole which is longitudinally elongated with respect to the threaded hole and is positioned so that the entirety of the threaded hole, when viewed in the nonlongitudinal direction, is circumscribed by a projected perimeter of the elongated hole irrespective of whether the first and second connectors are joined to each other to permit or to resist relative longitudinal translation of the first and second connectors;
wherein a threaded fastener extends through the elongated hole and into the threaded hole, the fastener being selectively securable to
a) loosely connect the first and second connectors to each other thereby permitting relative longitudinal translation of the first and second connectors, and
b) tightly connect the first and second connectors to each other thereby resisting relative longitudinal translation of the first and second connectors.

5. The actuation assembly of claim 4 wherein the longitudinal dimension of the elongated hole is greater than the diameter of the threaded hole by an amount large enough that the threaded hole remains within the projected perimeter of the elongated hole provided that a tolerance of a pre-specified magnitude is not exceeded.

6. The actuation assembly of claim 5 wherein the tolerance of the pre-specified magnitude includes at least one of a component manufacturing tolerance, an assembly tolerance, and a processing tolerance.

7. The actuation assembly of claim 4 wherein the longitudinal dimension of the elongated hole is greater than the diameter of the threaded hole by an amount large enough that the threaded hole remains exactly within the projected perimeter of the elongated hole when the actuation assembly exhibits an inaccuracy substantially equal to a tolerance of a pre-specified magnitude.

8. The actuation assembly of claim 4 wherein when the fastener is loosely connected the permitted longitudinal translation accommodates variation in longitudinal separation between the torque input element and the torque output element, and when the fastener is tightly connected the resisted relative longitudinal translation synchronizes operation of the torque output element with the torque input element.

9. The actuation assembly of claim 3 wherein:
the bridging element is an external portion, the first connector includes a threaded hole that penetrates into or through the first connector in a non-longitudinal direction;
the external portion includes a hole which is longitudinally elongated with respect to the threaded hole and is positioned so that the entirety of the threaded hole, when viewed in the nonlongitudinal direction, is circumscribed by a projected perimeter of the elongated hole irrespective of whether the first and second connectors are joined to each other to permit or to resist relative longitudinal translation of the first and second connectors;
wherein a threaded fastener extends through the elongated hole and into the threaded hole, the fastener being selectively securable to
a) loosely connect the first and second connectors to each other thereby permitting relative longitudinal translation of the first and second connectors, and
b) tightly connect the first and second connectors to each other thereby resisting relative longitudinal translation of the first and second connectors.

10. The actuation assembly of claim 1 wherein the connector assembly has:
a) a variable length LV which, prior to attaining a production threshold, is variable between a short length $LV_{SHORT}$ and a long length $LV_{LONG}$ and b) a fixed length LF which, after attaining the production threshold is fixed at a dimension no shorter than $LV_{SHORT}$ and no longer than $LV_{LONG}$.

11. The actuation assembly of claim 1 wherein the pre-threshold stage of production is a stage of production after which no accumulation of inaccuracies that would adversely affect the operation of the actuation assembly are expected to occur.

12. The actuation assembly of claim 1 wherein the bridging element is permanently affixed to the second connector by at least one weld.

13. The actuation assembly of claim 12, wherein the at least one weld includes a first weld at the second end of the second connector.

14. The actuation assembly of claim 13, wherein the at least one weld includes a second weld that fills at least a portion of an elongated opening formed in the second connector near the second end of the second connector.

15. The actuation assembly of claim 12, wherein the at least one weld includes a first weld that fills at least a portion of an elongated opening formed in the second connector near the second end of the second connector.

16. The actuation assembly of claim 1, wherein the first and second connectors comprise tubes having bores with non-round cross sections, wherein the bridging element comprises a bar that fits into the bores of the first and second connectors, and wherein a cross section of the bar is complimentary to the non-round cross sections of the bores of the tubes.

17. The actuation assembly of claim 16, wherein the non-round cross sections comprise generally square-shaped cross sections.

18. The actuation assembly of claim 1, wherein the bridging element comprises a sleeve having a bore with non-round cross section, wherein the second ends of the first and second connectors fit into the bore of the sleeve, and wherein a cross section of the first and second connectors is complimentary to the non-round cross section of the bore of the sleeve.

19. The actuation assembly of claim 18, wherein the non-round cross section comprises a generally square-shaped cross section.

20. The actuation assembly of claim 1, wherein the bridging element is constrained against rotating relative to the first and second connectors during relative translational movement between the first and second connectors.

* * * * *